United States Patent Office 3,450,131
Patented June 17, 1969

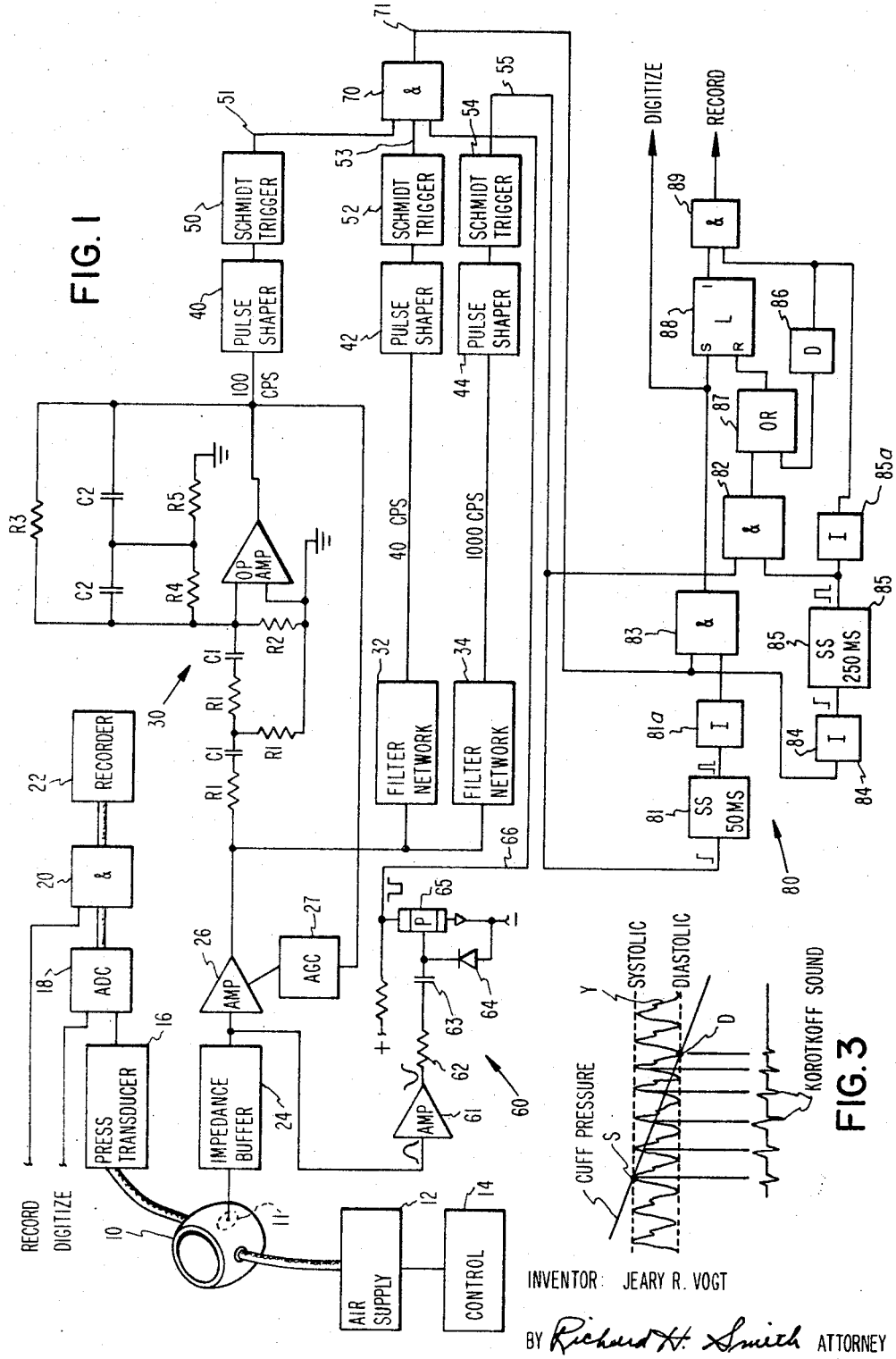

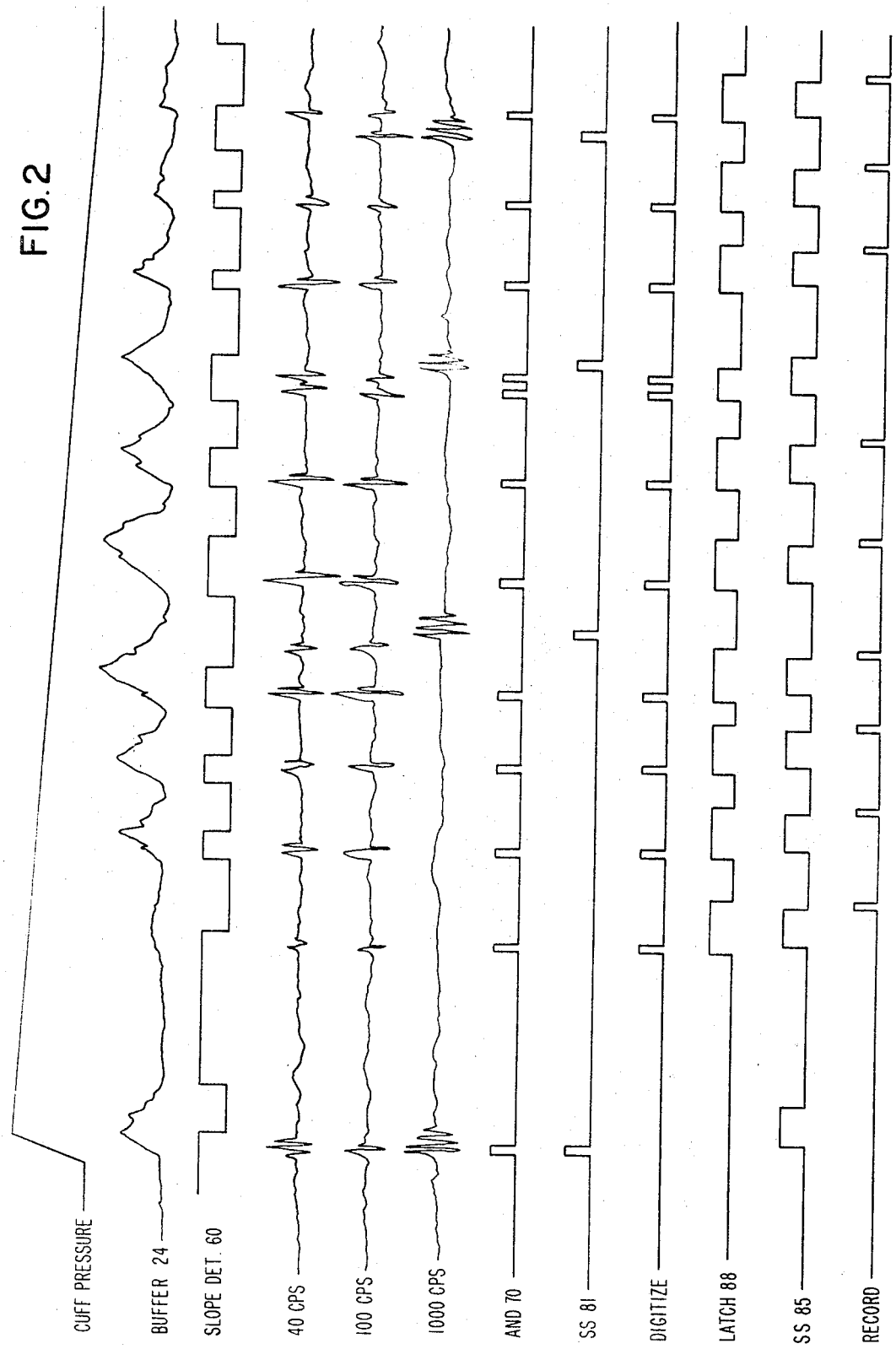

3,450,131
BLOOD PRESSURE MEASURING SYSTEM WITH KOROTKOFF SOUND DETECTOR
Jeary R. Vogt, Rochester, Minn., assignor to International Business Machines Corporation, Armonk, N.Y., a corporation of New York
Filed Jan. 9, 1967, Ser. No. 608,130
Int. Cl. A61b 5/02
U.S. Cl. 128—2.05
11 Claims

ABSTRACT OF THE DISCLOSURE

Automatic indirect systolic and diastolic blood pressure measurement is performed by a pair of frequency selection circuits sensitive to 40 and 100 c.p.s. components occurring in an audio input generated by a microphone positioned under an arm cuff placed over the subject's brachial artery. Simultaneous outputs from the frequency circuits occurring at a time when the subject's instantaneous circulatory pressure is stable or increasing cause a Korotkoff sound detection pulse to be transmitted to a digital artifact rejection circuit. This circuit cooperates with a 1000 c.p.s. frequency selection circuit to trigger an analog to digital converter to measure the cuff pressure in response to the Korotkoff detection pulse if the pulse does not occur within the 50 millisecond period immediately following occurrence of a 1000 c.p.s. component in the audio input. Further the artifact rejection circuit prevents recordation of the ADC reading if a 1000 c.p.s. component is detected in the audio input within a 250 millisecond period following the occurrence of the Korotkoff detection pulse.

Background of the invention

This invention relates to blood pressure measuring systems and, more particularly, to a blood pressure system which automatically implements the Korotkoff technique of indirect blood pressure estimation.

The Korotkoff method of indirectly measuring blood pressure has long been practiced on a manual basis and is far and away the most widely used method of indirectly estimating blood pressure. When practiced properly, this method is also probably the most convenient and reliable method of indirect blood pressure estimation devised to date.

In automatic systems for implementing the Korotkoff method, much difficulty has been encountered in handling the problem caused by so-called artifact. Artifact or artifact signals is the term employed in the art to indicate non-blood-pressure related signals which can be mistakenly construed as blood pressure signals and which therefore cause erroneous blood pressure readings to be taken. For example, movement of the subject as well as extraneous equipment noise occurring during the blood pressure measurement process often causes sounds which contain frequency components in the 30–150 c.p.s. range and which can thus be mistaken for Korotkoff sounds. A clinician who is manually executing a measurement can quite often through the exercise of subjective judgment based on his observation of the subject, etc., rule out these artifact signals and ignore them or else start the measurement cycle over.

However, automatic systems employing Korotkoff detectors have not been as effective as the clinician in eliminating the adverse effects caused by artifact signals. As a result, automatic Korotkoff systems have experienced only limited acceptance by the medical profession.

Objects and summary of the invention

It is an object of the invention to provide an improved blood pressure measurement system employing means for detecting Korotkoff sounds.

Another object is to provide an indirect blood pressure measuring system having a high degree of artifact rejection and therefore having a reliability which is significantly improved over previous automatic methods.

In accordance with a first aspect of the invention, frequency selective detection circuits are provided to monitor an input signal representative of the pressure variations occurring in the subject's brachial artery. These circuits are combined with a trailing edge slope detector in such a manner that the output of the frequency selective circuits is deemed to be indicative of a valid Korotkoff sound if it occurs when the slope of the blood pressure signal is either positive or substantially zero. The theory of this is based upon the known fact the Korotkoff sounds occur when the blood pressure waveform is on the upswing.

According to a second aspect of the invention, a separate frequency selection network is provided to detect artifact signals, i.e., signals in the 1000 c.p.s. frequency range, and the output therefrom is employed to initiate a first timer which operates to inhibit, for a first predetermined period of time, any outputs which may be generated by the Korotkoff frequency detection circuits. Thus, if an output issues from the Korotkoff network during a predetermined time period following the detection of an artifact signal, the Korotkoff output is suppressed. Further, each Korotkoff output which is not suppressed is stored for a second predetermined period of time. If during this latter period of time no artifact signal is detected, a confirmatory pulse is transmitted for the purpose of validating the preceding Korotkoff pulse. If an artifact signal is detected during the second predetermined period of time, no confirmatory pulse is transmitted and the preceding Korotkoff pulse is ignored by the remaining portions of the system.

The theory of this aspect of the invention is that artifact signals manifested in the Korotkoff frequency range usually include components in the 1000 c.p.s. frequency range, which components do not always occur simultaneously with the Korotkoff range components. Thus any signal detected in the Korotkoff range by the present system is ignored if it occurs during either of two predetermined time periods occurring immediately before and after a 1000 c.p.s. signal.

The foregoing and other objects, features and advantages of the invention will be apparent from the following more particular description of a preferred embodiment of the invention, as illustrated in the accompanying drawings.

Brief description of the drawings

FIG. 1 is a schematic circuit diagram showing an automatic indirect blood pressure measurement system employing one embodiment of a Korotkoff sound detector in accordance with the invention.

FIG. 2 is a waveform diagram illustrating the shape and interrelation of several of the signals generated by the circuit of FIG. 1.

FIG. 3 is a schematic diagram illustrating the well-known Korotkoff technique of indirectly estimating systolic and diastolic blood pressure.

Description of the preferred embodiment

Before describing the system of the invention, a description of the Korotkoff indirect blood pressure technique is hereinafter given with reference to FIG. 3. The waveform Y represents the pattern of pressure variation at a given point in a subject's circulatory system. The level of maximum pressure is known as systolic pressure and the level of minimum pressure is known as diastolic pressure. To estimate these two pressure levels, an inflatable arm cuff is wrapped about a limb, usually the arm, in juxtaposition to the brachial artery. An audio pick-up device such as a stethoscope or a microphone is inserted under the arm cuff and positioned directly over the artery.

The air pressure in the cuff is then raised to a level which is known to be above the subject's systolic level. The cuff pressure is then bled off at some substantially constant rate and at the same time the output of the audio pick-up is observed to detect the occurrence of Korotkoff sounds. As shown in FIG. 3, a Korotkoff sound is generated each time the subject's blood pressure wave crosses over the cuff pressure in a positive-going direction. Thus, no Korotkoff sounds are generated when the cuff pressure is above systolic level and none are generated when the cuff pressure drops below diastolic level. An estimate of the systolic level is obtained by noting the cuff pressure S at the time of occurrence of the first Korotkoff sound and an estimate of the diastolic level is obtained by noting the cuff pressure D at the time of occurrence of the last Korotkoff sound. Korotkoff sounds are relatively distinct and easy to discern since they are sharp "snapping" sounds occurring in a relatively low frequency band extending substantially from 30 c.p.s. to 150 c.p.s. The exact cause of the sounds has not been specifically identified but their predictability and reliability as estimators of blood pressure is generally accepted.

Referring to FIG. 1, a detailed description is hereinafter given of the Korotkoff sound detector and blood pressure measuring system of the invention. An inflatable arm cuff 10 is wrapped around the arm of a subject and is adapted to be inflated by an air supply 12 under the control of a control unit 14. Control unit 14 operates each time a blood pressure measurement is to be taken to inflate cuff 10 to some predetermined pressure level above the systolic pressure level of the subject. Thereafter, the control unit causes the cuff to deflate gradually to some predetermined lower pressure known to be below the diastolic pressure level of the subject.

A pressure transducer 16 is coupled into the air system of the cuff and provides a continuous output signal representative of the cuff pressure to an analog to digital converter 18. The latter operates each time it receives a DIGITIZE input signal to generate a digital representation of the cuff pressure. This digital representation is present at the output of converter 18 and is gated by an AND gate 20 to a recorder 22 in response to a RECORD signal. The DIGITIZE and RECORD signals are generated by the Korotkoff sound detection portion of the invention, as described subsequently.

A microphone 11 is attached to the inside of cuff 10 so as to be positioned over the brachial artery of the subject. The sound generated by the artery is picked up by the microphone and transmitted to an impedance buffer circuit 24, such as a double emitter follower, where the audio signal is conditioned for transmission into the detector circuits. The output from buffer 24 (see FIG. 2) is an audio signal representing the blood pressure variations occurring in the subject's artery. This signal is conditioned by an amplifier 26 for transmission to a set of frequency selective filter networks 30, 32 and 34 and is also conditioned by an inverting amplifier 61 for transmission to a slope detecting circuit 60.

Filter network 30 comprises an operational amplifier having the particular R-C input and feedback connections shown in FIG. 1. The output from network 30 constitutes an A-C "ringing" signal which is triggered each time a 100 c.p.s. signal component appears in the audio input signal. Actually, any signal component which lies in a narrow frequency band centered substantially around 100 c.p.s. will trigger an output from network 30. Since this frequency band lies in the Korotkoff frequency range, the output from network 30 indicates the presence of most Korotkoff sounds carried in the audio input. For the desired 100 c.p.s. frequency band selection, the following are preferred values for the R and C input and feedback components of network 30:

| | |
|---|---|
| R1 | 78.7K |
| R2 | 51K |
| R3 | 499K |
| R4 | 187K |
| R5 ohms | 232 |
| C1 mf | 0.02 |
| C2 mf | 0.15 |

The 100 c.p.s. output from network 30 is transmitted to a pulse shaping circuit 40 which constitutes a positive envelope detector, also sometimes known as an AM detector. The output from circuit 40 is transmitted to a Schmitt trigger 50 which generates a squarewave output on line 51. This output rises to a predetermined positive level for a duration coincident with the period of time that the output signal from circuit 40 exists above some positive threshold level. The output on line 51 is thus a detection pulse signifying the presence of a 100 c.p.s. signal component in the audio input signal.

The frequency selection channel comprising filter network 32, pulse shaper 42 and Schmitt trigger 52 operates in the same manner as the above described channel to provide an output pulse on line 53 in response to each signal component in the audio input signal which lies in a narrow frequency band centered substantially about 40 c.p.s. Network 32 is constructed in the same manner as network 30 and the prefered R-C component values to enable detection in the 40 c.p.s. frequency band are as follows:

| | |
|---|---|
| R1 | 84.5K |
| R2 | 51K |
| R3 | 499K |
| R4 | 127K |
| R5 ohms | 147 |
| C1 mf | 0.047 |
| C2 mf | 0.47 |

The third frequency selection channel comprises a filter network 34, a pulse shaper 44 and a Schmitt trigger 54. Network 34 is constructed in the same manner as the network 30 but includes those R and C component values appropriate to render the network sensitive to components of the input signal lying in a relatively narrow frequency band centered substantially at 1000 c.p.s. Preferred component values for tuning the network 34 to this frequency band are as follows:

| | |
|---|---|
| R1 | 78.7K |
| R2 | 51K |
| R3 | 499K |
| R4 | 127K |
| R5 ohms | 232 |
| C1 mf | 0.002 |
| C2 mf | 0.015 |

The 1000 c.p.s. frequency selection channel is an artifact signal detection channel. Valid Korotkoff sounds do not include any frequency components in the 1000 c.p.s. band while most artifact signals, while also frequently including signal components in the 30–150 c.p.s. band, include 1000 c.p.s. components. As with pulse shapers 40 and 42, the circuit 44 is a positive envelope detector and Schmitt trigger 54 produces a squarewave output pulse on line 55 signifying the detection of an artifact signal.

The slope detection circuit 60 receives the amplified, inverted audio signal from amplifier 61 and provides a negative squarewave output pulse each time the slope of the original audio input signal (output from buffer 24) goes negative. The circuit comprises a transistor 65 which is held non-conducting whenever the slope of the audio input is substantially zero or positive. Under these conditions the voltage level on output line 66 is maintained positive. However, when the audio input begins dropping (the slope goes negative), the charging of capacitor 63 through resistor 62 reverse biases diode 64 and turns transistor 65 on. This causes the output voltage on line 66 to go negative and to stay negative so long as the audio input continues to decrease. As soon as the input levels off to zero slope or begins going positive, the voltage level on capacitor 63 forward biases diode 64 and turns transistor 65 off whereby the output on line 66 returns positive.

An AND circuit 70 receives as inputs the output on line 51 from the 100 c.p.s. selection channel, the output on line 53 from the 40 c.p.s. selection channel and the output on line 66 from the slope detection circuit. The output generated on line 71 by AND 70 is positive whenever all three inputs thereto are positive, otherwise, the output on line 71 is negative. Thus, a Korotkoff detection pulse appears on line 71 whenever both 40 and 100 c.p.s. signal components are simultaneously detected in the input signal at a time when the slope of the latter is either substantially zero or positive.

Korotkoff detection pulses on line 71 and artifact detection pulses on line 55 are transmitted to an artifact rejection logic circuit 80 which generates the aforementioned DIGITIZE and RECORD signals for use in measuring and recording blood pressure readings from the cuff 10. An artifact pulse on line 55 causes a singleshot multivibrator 81 to generate a 50 millisecond positive output signal which is inverted by inverter 81a and transmitted to the input of an AND circuit 83. The Korotkoff detection pulses on line 71 are transmitted to the second input of AND 83. Thus, a DIGITIZE output signal is generated by the latter circuit in response to each Korotkoff detection pulse which is generated at a time which does not lie within the 50 millisecond time period immediately following an artifact pulse. In other words, artifact pulses on line 55 cause singleshot 81 to decondition AND 83 so that Korotkoff pulses on line 71 do not cause the generation of DIGITIZE pulses for the period of the singleshot. The theory of this is that any frequency components detected at the 40 and 100 c.p.s. frequencies in the audio input within 50 milliseconds of an artifact signal are very likely not caused by valid Korotkoff signals and thus the detection thereof is not good cause for converter 18 to take a reading of the cuff pressure.

Each DIGITIZE pulse from AND 83 causes a bistable latch circuit 88 to be set, causing the output thereof to go positive. Also, a singleshot multivibrator 85 is triggered into operation at the termination of each Korotkoff detection pulse on line 71. Singleshot 85 has a time period of 250 milliseconds and thus the output thereof goes positive at the termination of each Korotkoff detection pulse and stays positive for 250 milliseconds. This output is used to partially condition AND 82, whereby during the 250 millisecond time interval any artifact detection pulse occurring on line 55 is gated by AND 82 through OR circuit 87 to reset latch 88. This causes the output of the latch to go negative.

When the 250 millisecond output pulse from singleshot 85 terminates, a positive signal is transmitted by an inverter 85a to OR 87 through a delay circuit 86 and to the input of an output AND circuit 89. If at the time AND 89 receives this positive input signal the set output of latch 88 is still positive, a positive RECORD pulse is transmitted from the output of AND 89. The output from AND 89 in this situation remains positive for the period of delay circuit 86 since as soon as the positive output from inverter 85a propagates through delay 86 it resets latch 88 and causes the set output thereof and also the output from AND 89 to go negative.

If, however, an artifact detection pulse occurs on line 55 in the 250 millisecond time period established by singleshot 85, latch 88 is immediately reset through AND 82 and therefore no RECORD signal can be generated. It is thus seen that each RECORD pulse confirms the fact that no artifact pulse was detected in the 250 millisecond time period immediately following the preceding DIGITIZE pulse.

The RECORD pulse validates the pressure reading taken by ADC 18 in response to the preceding DIGITIZE pulse and causes the reading, as previously discussed, to be recorded by recorder 22.

*Operation*

Referring now to both FIGS. 2 and 3, the operation of the system of the invention during an exemplary blood pressure measurement cycle is described. To start the cycle, the cuff pressure is raised from some level below diastolic to a level above systolic pressure. As shown in FIG. 2, this sudden pressure transition, which is accompanied by the sound of valves opening and closing, etc., generates a sound which is picked up by microphone 11 and which appears at the output of buffer 24. As shown, this sound is a wide band noise including 40, 100 and 1000 c.p.s. components. Accordingly, AND 70 generates an output pulse but the simultaneous output generated by singleshot 81 deconditions AND 83 so that no DIGITIZE pulse is generated. Also, since no pulse issues from AND 83, latch 88 is not set and no RECORD pulse is generated at the termination of the output from singleshot 85.

As the cuff pressure decreases to a level where blood begins to be forced through the artery past the cuff, blood pressure sounds are detected by the microphone and appear in the output from buffer 24. As indicated in FIG. 2, the first of these sounds includes a Korotkoff sound since the positive level of slope detector 60 coincides with simultaneous output pulses from the 40 and 100 c.p.s. frequency channels thereby resulting in an output pulse being issued from AND 70. This pulse triggers singleshot 85 and causes AND 83 to generate a DIGITIZE pulse, setting latch 88. When singleshot 85 times out and its output goes negative, AND 89 generates a RECORD pulse. This pulse causes the cuff pressure reading generated by ADC 18 in response to the DIGITIZE pulse to be recorded by recorder 22.

Following the first Korotkoff sound, similar sounds are detected during the positive going portion of each blood pressure pulse whereby additional ADC readings are recorded. Between the fourth and fifth Korotkoff sounds, a second artifact signal occurs and is picked up by both the 40 and 100 c.p.s. frequency channels as well as the 1000 c.p.s. channel. However, since the artifact signal occurred at a time when the output of slope detector 60 was negative, no output issues from AND 70, no DIGITIZE pulse is generated and no pressure reading is taken.

At a time approximately coinciding with the seventh Korotkoff sound, the 1000 c.p.s. frequency channel picks up a third artifact signal. Slightly before this signal is detected in the 1000 c.p.s. channel a pair of closely spaced pulses are noted to have issued from AND 70, both of which triggered DIGITIZE pulses. It is quite likely that one, if not both of these Korotkoff detection pulses, was due to the occurrence of the artifact. However, since the artifact signal occurs within 250 milliseconds of the termination of the first of the two DIGITIZE pulses, it causes latch 88 to be reset before singleshot 85 times out. Therefore, no RECORD pulse is generated and neither of the two questionable ADC readings instigated by the DIGITIZE pulses is recorded.

At a time prior to the last Korotkoff sound, a fourth artifact signal is detected. However, as noted in FIG. 2, this signal does not have a detectable component in the 40 c.p.s. frequency range and therefore no pulse issues from AND 70 since input line 53 thereto never went positive.

At the end of the blood pressure measurement cycle recorder 22 contains a list of nine cuff pressure readings recorded in response to the nine RECORD pulses generated during the cycle. The first of these recorded readings is an approximation of the subject's systolic pressure level and the last of the readings is an estimation of the subject's diastolic pressure level.

If desired, additional logic circuits may be employed to distinguish the first of the RECORD pulses of the series from the last pulse thereof so that the only pressure readings recorded are those corresponding to the systolic and diastolic pressures. However, since this type of ancillary circuitry is not directly related to the present invention, it is not herein shown. Also, it may be desirable to employ some type of automatic gain control in association with the amplifier 26 which supplies the audio input signal to the frequency selection circuits. As shown in FIG. 1, an automatic gain control circuit 27 having its input connected to the output of filter network 30 is constructed so as to provide a gain control output signal to amplifier 26 which causes the gain thereof to decrease whenever the average background noise level in the output signal from network 30 rises above a predetermined minimum. The object of decreasing the gain of amplifier 26 in this manner is to keep the average level of the noise signal which is passed by each of the three filter networks below that which will cause the corresponding Schmitt triggers to fire. An alternative way of accomplishing the same result would be to render the firing thresholds of the Schmitt triggers variable in accordance with the noise level, i.e., as the level of noise present in the signal increases, the firing threshold levels of the trigger circuits 50, 52, and 54 would be caused to increase accordingly, the gain of amplifier 26 remaining constant.

While the invention has been particularly shown and described with reference to a preferred embodiment thereof, it will be understood by those skilled in the art that the foregoing and other additions and changes in form and details may be made therein without departing from the spirit and scope of the invention.

I claim:

1. In a Korotkoff sound detector, the combination comprising:
   means generating an input signal representative of the pressure variations in a circulatory system;
   slope detection means generating an inhibit pulse coinciding in duration with the trailing slope portion of each pulse occurring in said input signal;
   frequency detection means receiving said input signal and providing a detection output in response to each occurrence in said signal of a component lying in the Korotkoff frequency range; and
   a gating circuit receiving inputs from said slope detection means and from said frequency detection means and issuing an output signal in response to each said detection output not occurring during an inhibit pulse.

2. The Korotkoff sound detector set forth in claim 1, wherein said frequency detection means comprises:
   a filtering network responsive only to signals in a narrow frequency band centered substantially about 100 c.p.s.; and
   a Schmitt trigger circuit receiving the output from said filtering network and issuing a first detection pulse having a predetermined amplitude and having a width determined by the duration of said output from said filtering network.

3. The Korotkoff sound detector set forth in claim 2, wherein said frequency detection means further comprises:
   a second filtering network responsive only to signals in a narrow frequency band centered substantially about 40 c.p.s.; and
   a second Schmitt trigger circuit receiving the output from said second filtering network and issuing a second detection pulse having a predetermined amplitude and having a width determined by the duration of said output from said second filtering network, said gating circuit generating said output signal upon coincidence of a first detection pulse and a second detection pulse at a time not coincident with an inhibit pulse.

4. The Korotkoff sound detector set forth in claim 3, wherein said slope detection means comprises:
   a slope detecting circuit generating a positive level output signal when the slope of said input signal is positive or substantially zero and generating a negative level output signal when the slope of said input signal is negative.

5. In a Korotkoff sound detector, the combination comprising:
   means generating an input signal representative of the pressure variations in a circulatory system;
   first detection means receiving said input signal and providing a detection pulse in response to each occurrence in said signal of a component lying in the Korotkoff frequency range;
   second detection means receiving said input signal and providing an artifact pulse in response to each occurrence in said signal of a component lying in the artifact frequency range;
   output means for transmitting said detection pulses to external utilization circuits; and
   first timing means responsive to said second detection means for rendering said output means inoperative for a first predetermined period of time following each said artifact pulse.

6. The Korotkoff sound detector set forth in claim 5, further comprising:
   second timing means for transmitting a confirmatory pulse to said external utilization circuits a second predetermined period of time following each said detection pulse, said second timing means including inhibit means for preventing the transmission of said confirmatory pulse in response to occurrence of an artifact pulse during said second predetermined time period.

7. The system set forth in claim 6, further comprising:
   a blood pressure cuff adapted for use on a subject whose circulatory pressure is being measured;
   a transducer for making a measurement of the pressure in said cuff in response to each said detection pulse; and
   a recorder responsive to each said confirmatory pulse to record the value of pressure measured by said transducer in response to the preceding detection pulse.

8. The Korotkoff sound detector set forth in claim 5, wherein said first detection means comprises:
   a filtering network responsive only to signals in a narrow frequency band centered substantially about 100 c.p.s.; and
   a Schmitt trigger circuit receiving the output from said filtering network and issuing a detection pulse having a predetermined amplitude and having a width determined by the duration of said output from said filtering network.

9. The Korotkoff sound detector set forth in claim 8, wherein said second detection means comprises:
   a second filtering network responsive only to signals in a narrow frequency band centered substantially about 1000 c.p.s.; and
   a Schmitt trigger circuit receiving the output from said second filtering network and issuing an artifact pulse having a predetermined amplitude and having a width determined by the duration of said output from said second filtering network.

10. The Korotkoff sound detector set forth in claim 6, wherein said first timing means comprises:
    a singleshot multivibrator responsive to each said artifact pulse to generate an output pulse of duration equivalent to said first predetermined period of time, said output pulse being transmitted to said output means to render the same inoperative.

11. The Korotkoff sound detector set forth in claim 10, wherein said second timing means comprises:
   a bistable latch circuit connected to be set by each said detection pulse;
   a second singleshot multivibrator responsive to each said detection pulse for generating a second output pulse of duration equivalent to said second predetermined period of time;
   means for resetting said latch circuit in response to the occurrence of an artifact pulse during the period of said second output pulse; and
   means responsive to the state of the set output of said latch at the termination of said second output pulse for generating a confirmatory pulse.

References Cited

UNITED STATES PATENTS

| | | | |
|---|---|---|---|
| 3,126,886 | 3/1964 | Karsh | 128—2.05 |
| 3,132,208 | 5/1964 | Dymski et al. | 128—2.05 X |
| 3,137,292 | 6/1964 | Richter et al. | 128—2.05 |
| 3,149,628 | 9/1964 | Bolie | 128—2.05 |
| 3,171,406 | 3/1965 | Baum et al. | 128—2.05 |
| 3,229,685 | 1/1966 | Ringkamp et al. | 128—2.05 |
| 3,229,686 | 1/1966 | Edmark | 128—2.05 |
| 3,349,763 | 10/1967 | Clements et al. | 128—2.05 |

WILLIAM E. KAMM, *Primary Examiner.*